US010599388B2

(12) United States Patent
Jehan et al.

(10) Patent No.: US 10,599,388 B2
(45) Date of Patent: *Mar. 24, 2020

(54) SYSTEM FOR MANAGING TRANSITIONS BETWEEN MEDIA CONTENT ITEMS

(71) Applicant: Spotify AB, Stockholm (SE)

(72) Inventors: Tristan Jehan, Brooklyn, NY (US); Sten Garmark, Stockholm (SE); Nicola Montecchio, New York, NY (US)

(73) Assignee: SPOTIFY AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/136,789

(22) Filed: Sep. 20, 2018

(65) Prior Publication Data

US 2019/0121603 A1 Apr. 25, 2019

Related U.S. Application Data

(63) Continuation of application No. 14/944,972, filed on Nov. 18, 2015, now Pat. No. 10,101,960.

(Continued)

(51) Int. Cl.
*G06F 3/16* (2006.01)
*G11B 27/038* (2006.01)
(Continued)

(52) U.S. Cl.
CPC .............. *G06F 3/165* (2013.01); *G06F 16/40* (2019.01); *G06F 16/636* (2019.01);
(Continued)

(58) Field of Classification Search
CPC .... G06F 3/165; G06F 16/438; G06F 16/4387; G06F 16/4393; G06F 16/683;
(Continued)

(56) References Cited

U.S. PATENT DOCUMENTS 7,855,333 B2 12/2010 Miyajima et al.
8,437,869 B1 5/2013 Bennett
(Continued)

FOREIGN PATENT DOCUMENTS

EP 1811496 A2 7/2007
WO 2007/036844 A2 4/2007

OTHER PUBLICATIONS

"Summons to attend Oral Proceedings Pursuant to Rule 115(1) EPC" issued in European Patent Application No. 16207410.8, Nov. 21, 2017.
(Continued)

*Primary Examiner* — Jesse A Elbin
(74) *Attorney, Agent, or Firm* — Merchant & Gould P.C.

(57) ABSTRACT

A system for playing media content items operates to provide smooth transitions between the media content items to continuously support a user's repetitive motion activity. The system can generate crossfade data containing information for transitions between media content items. The mix-in and mix-out points for the transitions are calculated to eliminate one or more portions of media content items that have lower musical energy than a majority portion of the items, and to maintain substantially consistent and/or stable musical energy (e.g., audio power or sound power) throughout the media content items including transitions therebetween.

20 Claims, 15 Drawing Sheets

Related U.S. Application Data

(60) Provisional application No. 62/163,865, filed on May 19, 2015.

(51) Int. Cl.
  *G06F 16/40* (2019.01)
  *G06F 16/635* (2019.01)
  *G06F 16/683* (2019.01)
  *H04W 4/80* (2018.01)

(52) U.S. Cl.
  CPC .......... *G06F 16/683* (2019.01); *G11B 27/038* (2013.01); *H04W 4/80* (2018.02); *Y02D 70/00* (2018.01); *Y02D 70/142* (2018.01); *Y02D 70/144* (2018.01); *Y02D 70/162* (2018.01); *Y02D 70/164* (2018.01); *Y02D 70/26* (2018.01)

(58) Field of Classification Search
  CPC ............... G06F 16/636; G06F 17/3005; G06F 17/30053; G06F 17/30056; G06F 17/30743; G06F 17/30764; G11B 27/038; G11B 2020/10546; G10H 1/46; G10H 2250/035
  USPC ............................................. 700/94; 381/119
  See application file for complete search history.

(56) References Cited

U.S. PATENT DOCUMENTS

| | | | |
|---|---|---|---|
| 8,805,693 | B2 | 8/2014 | Lindahl et al. |
| 2003/0183064 | A1 | 10/2003 | Eugene et al. |
| 2006/0107822 | A1 | 5/2006 | Bowen |
| 2007/0074617 | A1 | 4/2007 | Vergo |
| 2007/0169614 | A1 | 7/2007 | Sasaki et al. |
| 2008/0236370 | A1 | 10/2008 | Sasaki et al. |
| 2008/0249644 | A1 | 10/2008 | Jehan |
| 2014/0076125 | A1 | 3/2014 | Kellett et al. |
| 2014/0100683 | A1 | 4/2014 | White |
| 2014/0316789 | A1 | 10/2014 | Lowe et al. |
| 2015/0142147 | A1 | 5/2015 | Stanghed et al. |

OTHER PUBLICATIONS

Anonymous: "Musical analysis—Wikipedia", May 24, 2015 (May 24, 2015), XP055419571, Retrieved from the Internet: URL: https://en.wikipedia.org/w/index.php?title=Musical_analysis&oldid=663813215 [retrieved on Oct. 26, 2017].

Paul Finkelstein: "Music Segmentation Using Markov Chain Methods", Mar. 8, 2011 (Mar. 8, 2011), XP055419723, Retrieved from the Internet: URL: http://math.dartmouth.edu/~pw/M100W11/paul.pdf.

European Search Report issued in European Patent Application No. 16207410.8, dated Jun. 23, 2017.

Anonymous: "How to Use Crossfade in Audacity for Seamless Transitions Between Audio Tracks", May 5, 2015 (May 5, 2015), XP055291113, Retrieved from the Internet: URL: http://www.howtogeek.com/57252/how-touse-crossfade-in-audacity-for-seamless-transitions-between-audio-tracks/.

International Search Report and Written Opinion from related International Application No. PCT/EP2016/061043, dated Oct. 27, 2016.

The Echonest, "Analyzer Documentation", Version 3.2, Jan. 7, 2014, 7 pages.

U.S. Appl. No. 14/883,252, filed Oct. 14, 2015 for "Repetitive Motion Activity Enhancement Based Upon Media Content Selection".

U.S. Appl. No. 14/883,245, filed Oct. 14, 2015 for "Heart Rate Control Based Upon Media Content Selection".

U.S. Appl. No. 14/883,232, filed Oct. 14, 2015 for "Cadence Determination and Media Content Selection".

U.S. Appl. No. 14/883,298, filed Oct. 14, 2015 for "Cadence-Based Playlists Management System".

U.S. Appl. No. 14/883,273, filed Oct. 14, 2015 for "Multi-Track Playback of Media Content During Repetitive Motion Activities".

U.S. Appl. No. 14/883,295, filed Oct. 14, 2015 for "Search Media Content Based Upon Tempo".

U.S. Appl. No. 14/883,318, filed Oct. 14, 2015 for "Cadence and Media Content Phase Alignment".

U.S. Appl. No. 14/945,008 filed, Nov. 18, 2015 for "Identifying Media Content".

U.S. Appl. No. 14/883,323, filed Oct. 14, 2015 for "Accessibility Management System for Media Content Items".

U.S. Appl No. 14/883,336, filed Oct. 14, 2015 for "Selection and Playback of Song Versions Using Cadence".

U.S. Appl. No. 14/883,340, filed Oct. 14, 2015 for "Cadence-Based Selection, Playback, and Transition Between Song Versions".

The Echo Nest, "Acoustic Attributes Overview", Jul. 27, 2012, The Echo Nest, all pages.

| MEDIA CONTENT ITEM ID | MIX-IN POINT (T_in) | MIX-OUT POINT (T_out) | ... |
|---|---|---|---|
| 1 | 00:12:04 | 05:22:04 | ... |
| 2 | 00:04:02 | 07:12:03 | ... |
| 3 | 00:20:55 | 14:02:67 | ... |
| ... | ... | ... | ... |

*FIGURE 9*

SYSTEM FOR MANAGING TRANSITIONS BETWEEN MEDIA CONTENT ITEMS

CROSS-REFERENCE TO RELATED APPLICATION

This application is a Continuation of U.S. Ser. No. 14/944,972, filed Nov. 18, 2015, which claims priority to U.S. Ser. No. 62/163,865 filed on May 19, 2015 and entitled SYSTEM FOR MANAGING TRANSITIONS BETWEEN MEDIA CONTENT ITEMS, the disclosures of which are hereby incorporated by reference in their entireties.

BACKGROUND

Running, as well as many other recreation or fitness activities, includes repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity. Further, media content often contain portions that do not complement the repetitive motion activity as well as other portions.

SUMMARY

In general terms, this disclosure is directed to a system for managing transitions between media content items. In one possible configuration and by non-limiting example, the system operates to generate crossfade data containing information for transitions between media content items to continuously support a user's repetitive motion activity, and play back the media content items based on the crossfade data. Various aspects are described in this disclosure, which include, but are not limited to, the following aspects.

One aspect is a method of playing back media content items to continuously support a repetitive motion activity. The method may include acquiring, using at least one computing device, a user's cadence; obtaining, using the at least one computing device, crossfade data of first and second media content items, the crossfade data including a mix-out point of the first media content item and a mix-in point of the second media content item; playing back the first media content item on the at least one computing device, the first media content item having a tempo corresponding to the user's cadence; and playing back the second media content item on the at least one computing device with the mix-in point of the second media content item matching the mix-out point of the first media content item, the second media content item having a tempo corresponding to the user's cadence.

Another aspect is a method of generating data for transitions between media content items to continuously support a repetitive motion activity. The method may include determining mix-in points of media content items; determining mix-out points of the media content items, the mix-out point of a media content item configured to match the mix-in point of a subsequent media content item as the first and second media content items are played back; and generating data with the mix-in and mix-out points for the media content items. The mix-in point for a media content item is determined such that a musical energy of the media content item between a beginning of the media content item and the mix-in point of the media content item is substantially lower than a musical energy of the media content item between the mix-in point of the media content item and the mix-out point of the media content item. The mix-out point of the media content item is determined such that a musical energy of the media content item between the mix-out point of the media content item and an end of the media content item is substantially lower than the musical energy of the media content item between the mix-in point of the media content item and the mix-out point of the media content item.

Yet another aspect is a computer-readable storage medium comprising software instructions that, when executed, cause at least one computing device to: acquire a user's cadence; obtain crossfade data of first and second media content items, the crossfade data including a mix-out point of the first media content item and a mix-in point of the second media content item; play back the first media content item on the at least one computing device, the first media content item having a tempo corresponding to the user's cadence; and play back the second media content item on the at least one computing device with the mix-in point of the second media content item matching the mix-out point of the first media content item, the second media content item having a tempo corresponding to the user's cadence.

BRIEF DESCRIPTION OF THE DRAWINGS

FIG. 9 illustrates an example crossfade data including information about the mix-in points and mix-out points of the media content items.

DETAILED DESCRIPTION

Figure 1:
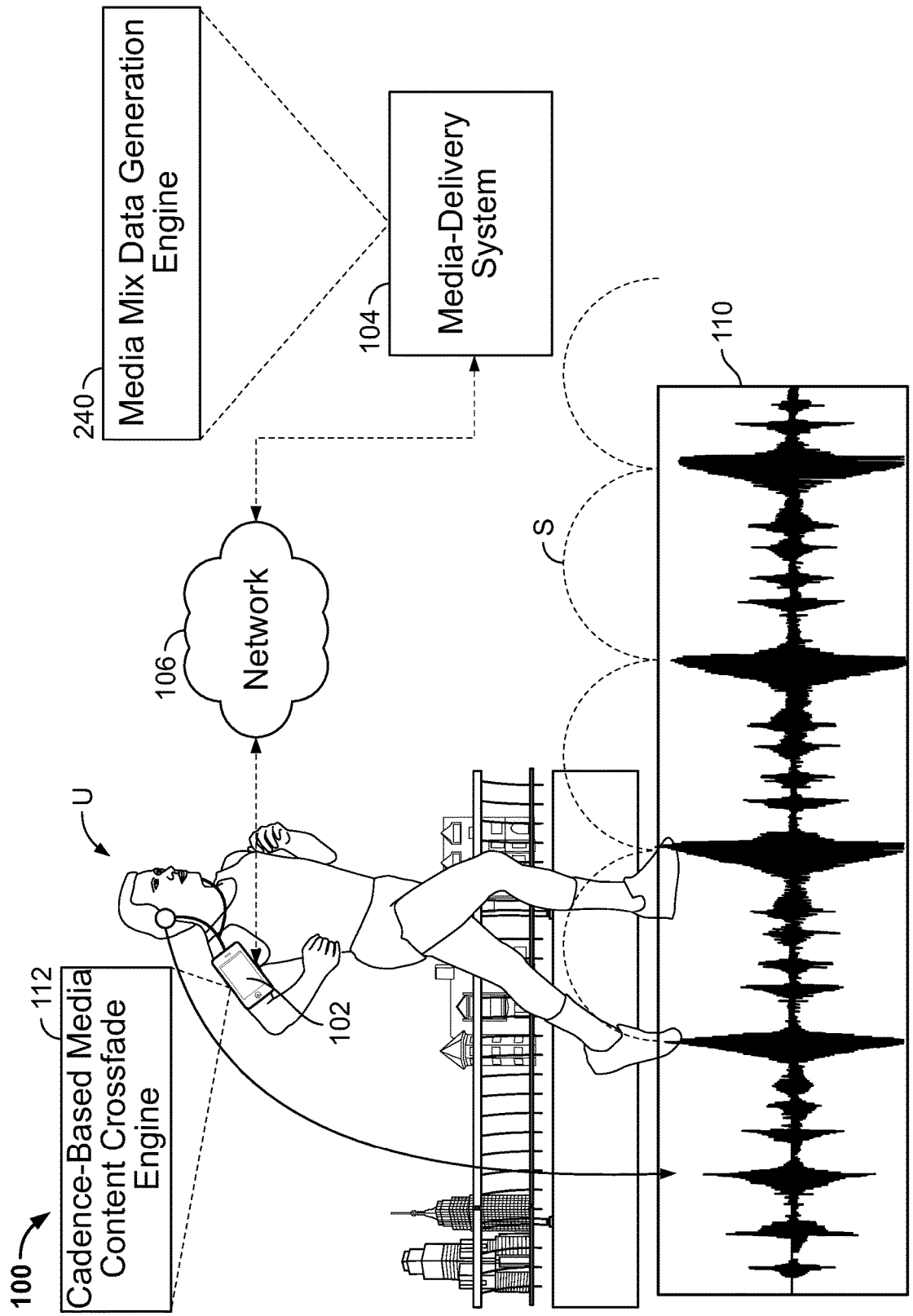
FIG. 1 illustrates an example system for managing transitions between media content items to continuously support a repetitive motion activity.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

In general, the present disclosure is directed to a system for playing media content items with smooth transitions to continuously support a user's repetitive motion activity. The system can generate crossfade data containing information for transitions between media content items. The crossfade data can include mix-in and mix-out points of media content items that are used to at least partially overlap media content items. The mix-in and mix-out points are calculated to eliminate one or more portions of media content items that have lower musical energy than a majority portion of the items, and to maintain substantially consistent and/or stable musical energy (e.g., audio power or sound power) throughout the media content items including transitions therebetween. For example, the mix-in and mix-out points are determined to crossfade media content items while maintaining an equal power throughout the media content items. A media-playback device is provided to acquire a user's cadence and play back a plurality of media content items having a tempo corresponding to the cadence while the user performs a repetitive motion activity. The media-playback device operates to play the media content items such that a mix-out point of a media content item matches a mix-in point of a subsequent media content item, thereby generally consistently maintain a musical energy (e.g., audio power or sound power) during transition between the two media content items. In certain examples, the media-playback device operates to match at least one beat around the mix-out point of the media content item with at least one beat around the mix-out point of the subsequent media content item to provide a consistent tempo over the transition between the media content items.

As such, the system of the present disclosure can play a plurality of media content items to continuously support a user's repetitive motion activity without distracting a user's cadence. The system is configured to ensure that a musical energy suitable for the repetitive motion activity continues over transitions of different media content items. The system provides a simple, efficient solution to transitions between media content items with consistent tempo and musical energy (e.g., audio power or sound power). In certain examples, the management process for transitions between media content items is executed in a server computing device, rather than the media-playback device. Accordingly, the media-playback device can save its resources for playing back media content items with such transitions, and the management process can be efficiently maintained and conveniently modified as appropriate without interacting with the media-playback device.

FIG. 1 illustrates an example system 100 for managing transitions between media content items to continuously support a repetitive motion activity. The example system 100 includes a media-playback device 102 and a media-delivery system 104. In some embodiments, a cadence-based media content crossfade engine 112 runs on the media-playback device 102, and a media mix data generation engine 240 runs on the media-delivery system 104. The system 100 communicates across a network 106. Also shown are a user U who is running. The user U's upcoming steps S are shown as well. A step represents a single strike of the runner's foot upon the ground.

The media-playback device 102 operates to play media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-playback device 102 plays media content for the user based on the user's cadence. In the example shown, the media output 110 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a media content item having a tempo equal to or approximately equal to 180 BPM. In other embodiments, the media-playback device 102 plays a media content item having a tempo equal or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media-playback device 102 plays a media content item having a tempo that is equal or approximately equal to an integer multiple (e.g., 2×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

In some embodiments, the media-playback device 102 operates to play music having a tempo that is within a predetermined range of a target tempo. In at least some embodiments, the predetermined range is plus or minus 2.5 BPM. For example, if the user U is running at a cadence of 180 steps per minute, the media-playback device 102 operates to play music having a tempo of 177.5-182.5 BPM. Alternatively, in other embodiments, the predetermined range is itself in a range from 1 BPM to 10 BPM. Other ranges of a target tempo are also possible.

Further, in some embodiments, the media content items that are played back on the media-playback device 102 have a tempo equal to or approximately equal to a user U's cadence after it is rounded. For example, the cadence may be rounded to the nearest multiple of 2.5, 5, or 10 and then the media playback device 102 plays music having a tempo equal to or approximately equal to the rounded cadence. In yet other embodiments, the media-playback device 102 uses the cadence to select a predetermined tempo range of music for playback. For example, if the user U's cadence is 181 steps per minute, the media-playback device 102 may operate to play music from a predetermined tempo range of 180-184.9 BPM; while if the user U's cadence is 178 steps per minute, the media-playback device 102 may operate to play music from a predetermined tempo range of 175-179.9 BPM.

The cadence-based media content crossfade engine 112 operates to make smooth transitions between different media content items which are played on the media-playback device 102 during a user's repetitive motion activity. The crossfade engine 112 is configured to overlap at least portion of media content items based on mix-in and mix-out points generated by the media mix data generation engine 240, thereby maintaining a constant output level to continuously support the user's repetitive motion activity without interruption. An example of the cadence-based media content crossfade engine 112 is described and illustrated in more detail with reference to FIGS. 10-15.

Figure 2:
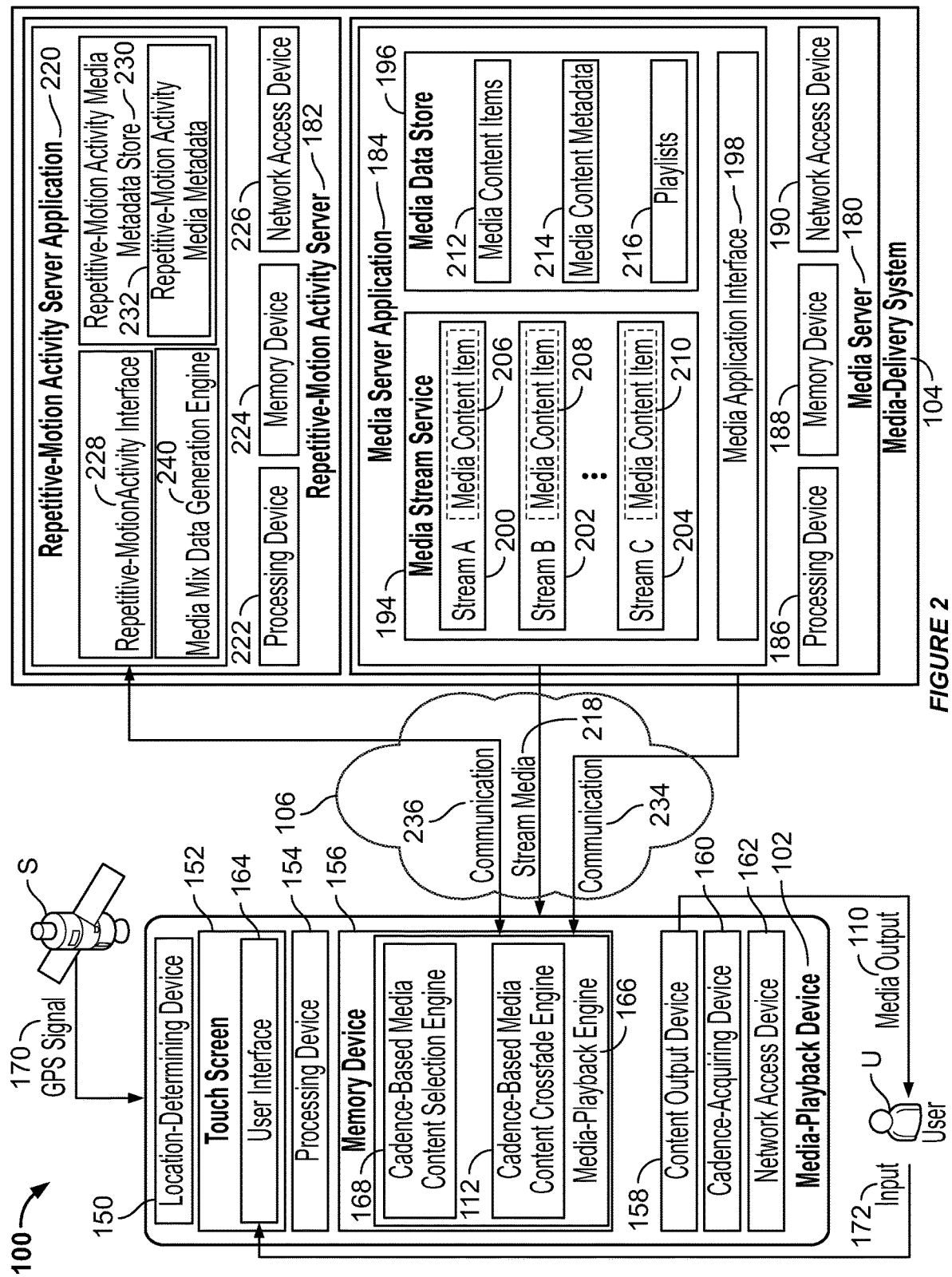
FIG. 2 is a schematic illustration of an example system for managing transitions between media content items to continuously support a repetitive motion activity.

The media mix data generation engine 240 operates to generate media mix data to be used for crossfading cadence-based media content items. As described herein, such media mix data can be incorporated in repetitive-motion activity media metadata 232 (FIG. 2). An example of the media mix data generation engine 240 is described and illustrated in more detail with reference to FIGS. 5-9.

FIG. 2 is a schematic illustration of an example system 100 for managing transitions between media content items to continuously support a repetitive motion activity. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a cadence-based media content selection engine 168 and the cadence-based media content crossfade engine 112.

The memory device 156 typically includes at least some form of computer-readable media. Computer readable media include any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media-playback engine 166 operates to play back one or more of the media content items (e.g., music) to encourage the running of the user U. As described herein, the media-playback engine 166 is configured to communicate with the media-delivery system 104 to receive one or more media content items (e.g., through the stream media 218) based on the cadence detected by the cadence-acquiring device 160.

The cadence-based media content selection engine 168 operates to retrieve one or more media content items based on a cadence of the user U acquired by the media-playback device 102 (e.g., the cadence-acquiring device 160 thereof). In some embodiments, the cadence-based media content selection engine 168 is configured to send a request to the media-delivery system 104 for media content items having a tempo corresponding to the acquired cadence, and receive information (e.g., the repetitive-motion activity media metadata 232) about such media content items for playback during the user's performance of repetitive motion activity.

In some embodiments, the cadence-based media content crossfade engine 112 is included in the media-playback engine 166. The cadence-based media content crossfade engine 112 operates to make smooth changeover between different media content items during a user's repetitive motion activity, thereby continuously supporting the repetitive motion activity. An example of the cadence-based media content crossfade engine 112 is described and illustrated in more detail with reference to FIGS. 10-15.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The repetitive-motion activity server 182 operates to provide repetitive-motion activity—specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228 and a repetitive-motion activity media metadata store 230.

In some embodiments, the repetitive-motion activity server application 220 may provide a list of media content items at a particular tempo to a media-playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 228 operates to receive requests or other communication from media-playback devices or other systems to retrieve information about media content items from the repetitive-motion activity server 182. For example, in FIG. 2, the repetitive-motion activity interface 228 receives communication 236 from the media-playback engine 166.

In some embodiments, the repetitive-motion activity media metadata store 230 stores repetitive-motion activity media metadata 232. The repetitive-motion activity media metadata store 230 may comprise one or more databases and file systems. Other embodiments are possible as well.

The repetitive-motion activity media metadata 232 operates to provide various information associated with media content items, such as the media content items 212. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that corresponds to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for managing transitions between media content items based on a user's cadence, other embodiments are possible as well. For example, in some embodiments, the media-playback device 102 includes a media data store 196 and the media-playback device 102 is configured to perform management of transitions between media content items based on a user's cadence without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to playback media content corresponding to the cadence of a repetitive motion activity on the media-playback device 102.

Figure 3:
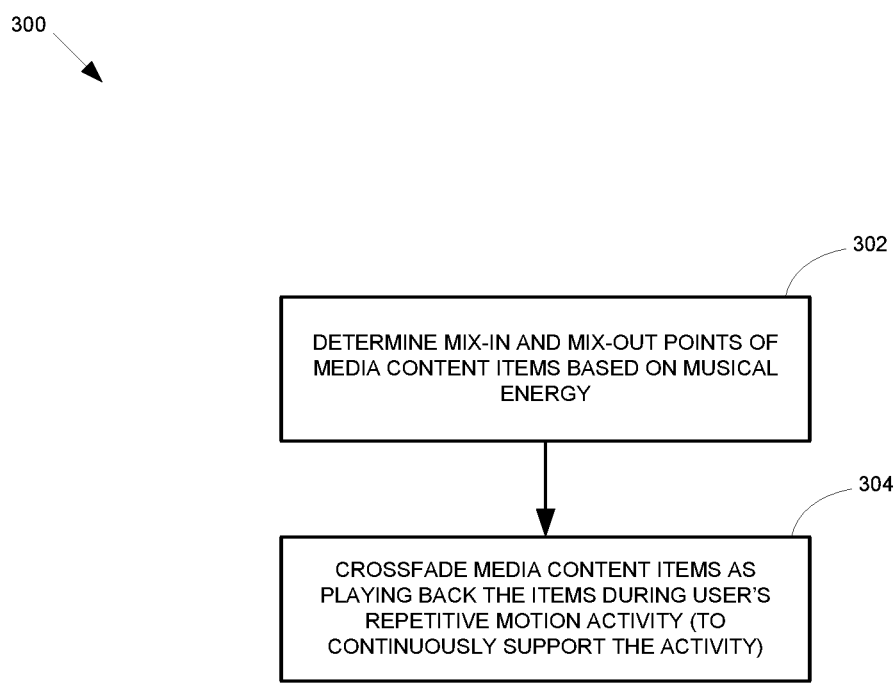
FIG. 3 is a flowchart illustrating an example method for operating the system for managing transitions between media content items to continuously support a repetitive motion activity.

FIG. 3 is a flowchart illustrating an example method 300 for operating the system 100 for managing transitions between media content items to continuously support a repetitive motion activity. In some embodiments, the method 300 includes operations 302 and 304.

At the operation 302, at least some of media content items are analyzed to determine mix-in and mix-out points thereof based on musical energy. In some embodiments, the operation 302 is performed by the media-delivery system 104 (e.g., the media mix data generation engine 240 thereof). In other embodiments, the operation 302 is performed by one or more other computing devices. A musical energy of a media content item is defined to represent one or more musical attributes of the media content item, as described in more detail with reference to FIG. 4. In some embodiments, the mix-in and mix-out points are included in the repetitive-motion activity media metadata 232. In other embodiments, the mix-in and mix-out points are stored in different forms. An example of the operation 302 is described and illustrated in more detail with reference to FIG. 5.

At the operation 304, the media-playback device 102 operates to crossfade media content items based on the mix-in and mix-out points of the items as the device 102 plays back the items in order during a user's repetitive motion activity. In other embodiments, the operation 304 can be performed by one or more other computing devices. An example of the operation 304 is described and illustrated in more detail with reference to FIG. 10.

Figure 4:
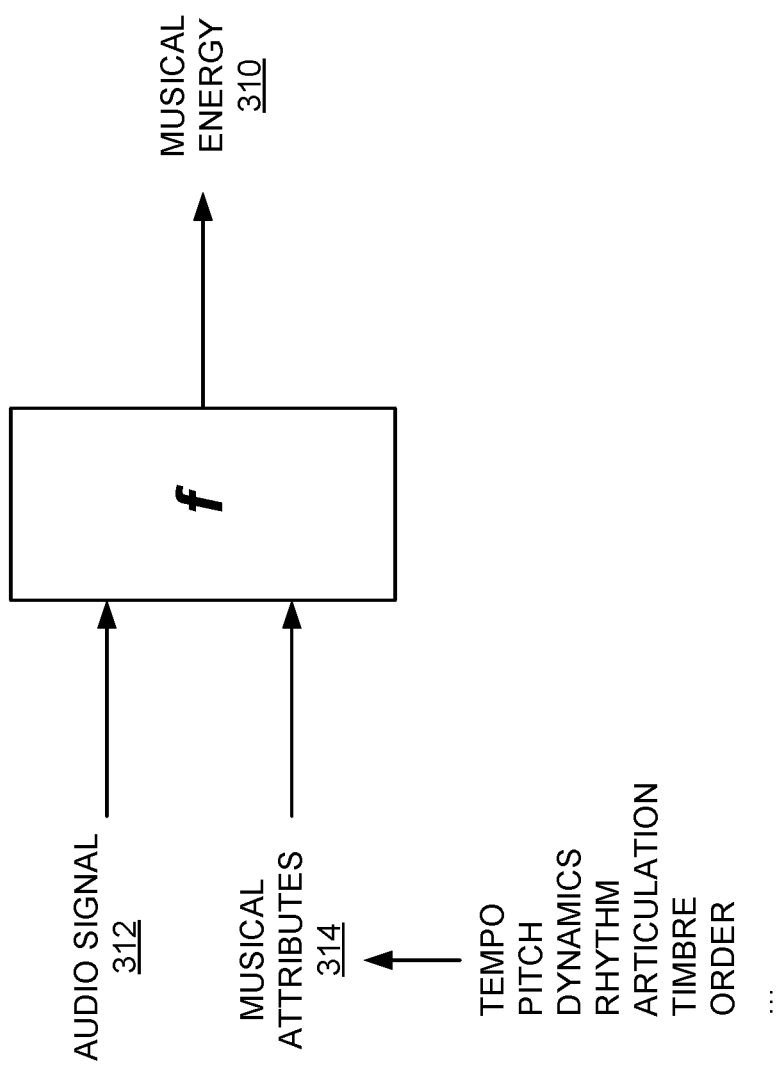
FIG. 4 illustrates an example musical energy used to determine mix-in and mix-out points of media content items.

FIG. 4 illustrates an example musical energy 310 that is used to determine mix-in and mix-out points of media content items. In some embodiments, the musical energy 310 of a media content item is calculated based on an audio signal 312. In other embodiments, the musical energy 310 is calculated based on one or more musical attributes 314. In yet other embodiments, the musical energy 310 is calculated based on a combination of the audio signal 312 and one or more musical attributes 314.

In some embodiments, the musical energy 310 is correlated with a level of the audio signal 312. The audio signal 312 is a representation of sound and can be characterized by various parameters, such as bandwidth, power level (measured in bels or decibel), and voltage level.

With the audio signal 312, in some embodiments, the musical energy 310 can be representative of audio power. Audio power can be defined as an electrical power transferred from an audio amplifier to a loudspeaker. The audio power can be measured in watts. A loudspeaker is an electroacoustic transducer, which converts an electrical audio signal into a corresponding sound. In some embodiments, such a loudspeaker is implemented as the content output device 158 (e.g., headphones or a speaker). In some embodiments, the audio amplifier is limited in the electrical energy it can amplify, and the loudspeaker is limited in the electrical energy they can convert to sound energy without distorting the audio signal or being damaged. The audio power can be calculated in various known manners.

In other embodiments, the musical energy 310 is representative of sound power (also referred to as acoustic power), which is a sound energy emitted, reflected, transmitted, or received, per unit item, which can be measured in watts. Sound power can be a rough measurement of the loudness of a particular sound while there are other factors (e.g., the sound's frequency or the loss of sound intensity due to distance from the sound's source) that affect the human perception of sound.

In addition or alternatively to the audio signal 312, the musical energy 310 can be correlated with one or more of the musical attributes 314. The music attributes 314 are characteristics, dimensions, or elements taken as parts or components of music. The music attributes 314 are defined with various parameters, such as tempo, pitch, dynamics, articulation, timbre, order, and any other elements. In some embodiments, tempo indicates a speed or pace of a given piece and is usually indicated in beats per minute (BPM), as described above. Pitch is a property that allows the ordering of sounds on a frequency-related scale. In some embodiments, pitch can be quantified as a frequency. Dynamics can refer to the volume of a sound or note. In other embodiments, dynamics can also refer to other aspects of the execution of a given piece, either stylistic (e.g., staccato, legato, etc.) or functional (velocity, etc.). Articulation refers to the musical performance technique that affects the transition or continuity on a single note, or between multiple notes or sounds. Timbre is the quality of a musical note, sound, or tone that distinguishes different types of sound production, such as voices and musical instruments, string instruments, wind instruments, and percussion instruments. The physical characteristics of sound that determine the perception of timbre include spectrum and envelope. Order is the specific arrangement of a set of discrete entities, or parameters, such as pitch, dynamics and timbre.

In some embodiments, the musical energy 310 is in a functional relationship with the audio signal 312, one or more of the musical attributes 314, or a combination of the audio signal 312 and one or more of the musical attributes 314. For example, the musical energy 310 can be obtained by one or more audio analysis tools of various types.

Although the musical energy 310 is illustrated to be associated with the audio signal 312 and/or the musical attributes 314, other embodiments of the musical energy 310 can represent one or more other aspects of a content media item, which are suitable to support user's repetitive motion activities.

Figure 5:
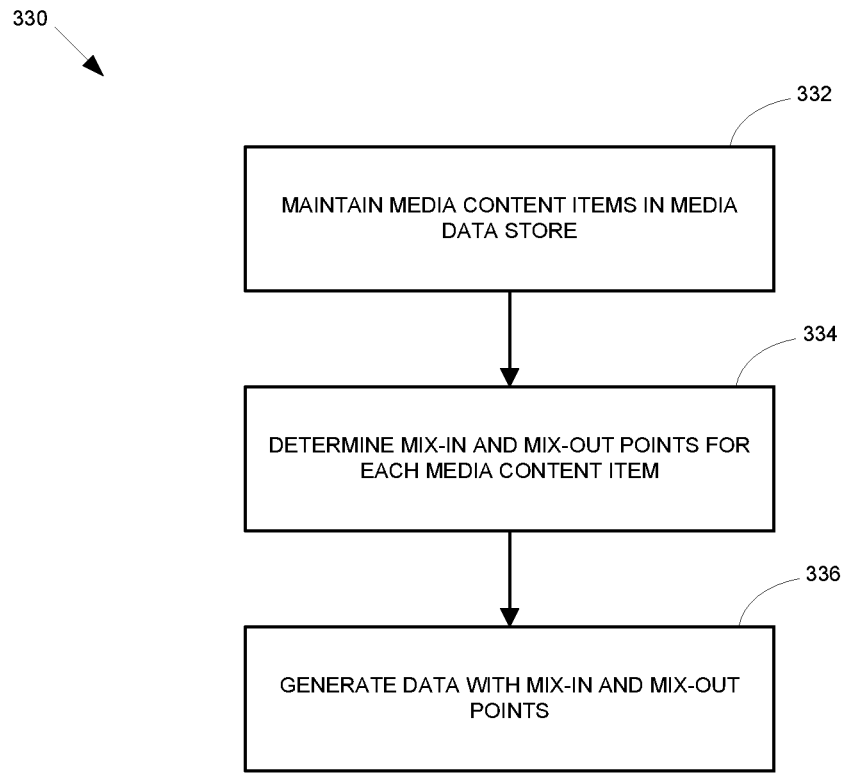
FIG. 5 illustrates an example method of performing an operation of FIG. 3.

FIG. 5 illustrates an example method 330 of performing the operation 302 of FIG. 3. In some embodiments, the method 330 includes operations 332, 334, and 336.

In some embodiments, the media-delivery system 104 including the media mix data generation engine 240 is configured to execute the method 330. Although it is described in this document that the media-delivery system 104 (including the media mix data generation engine 240) is used to perform the method 330, it is apparent that the method 330 can be performed by other computing devices in other embodiments.

At the operation 332, the media-delivery system 104 operates to maintain media content items 212 in the media data store 196. In other embodiments, media content items 212 can be stored in other devices, such as independent computing devices or the media-playback device 102.

At the operation 334, the media-delivery system 104 (e.g., the media mix data generation engine 240) operates to determine mix-in points ($T_{IN}$) and mix-out points ($T_{OUT}$) (FIG. 8) for at least some of the media content items 212. An example of the operation 334 is illustrated and described in more detail with reference to FIGS. 6-9.

At the operation 336, the media-delivery system 104 operates to generate data (e.g., crossfade data 400 in FIG. 9) with the mix-in and mix-out points determined in the operation 334. In other embodiments, the mix-in and mix-out points are maintained as other data from the media metadata 232. For example, the media metadata 232 can be populated with the mix-in and mix-out points.

Figure 6:
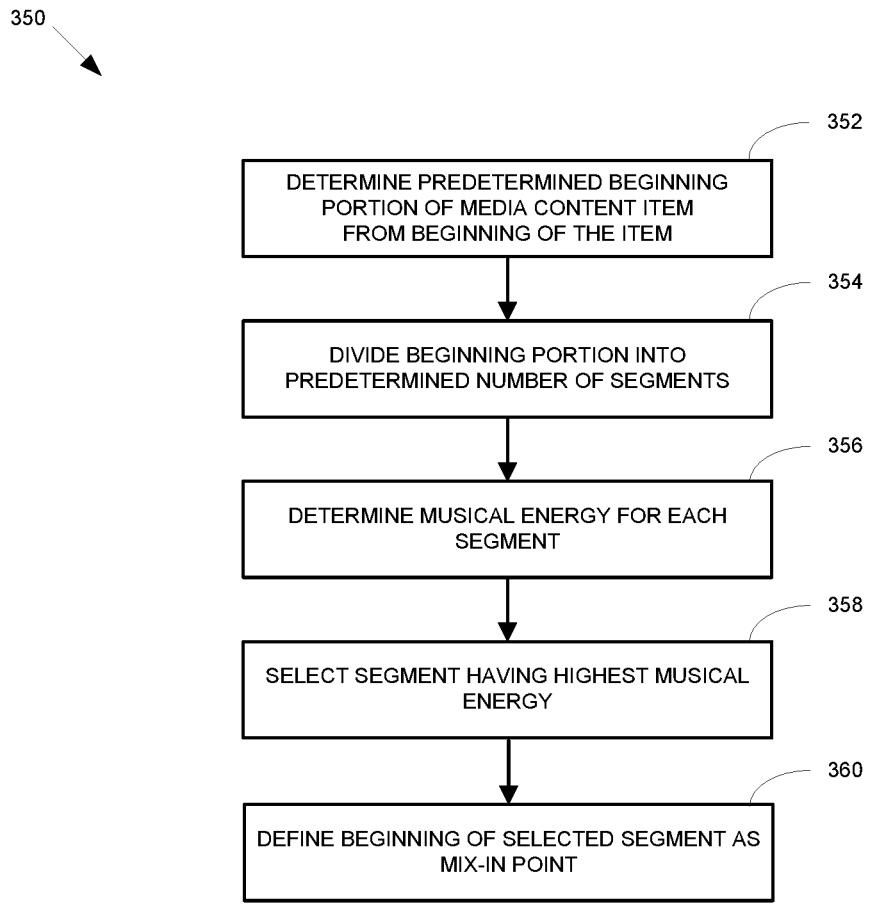
FIG. 6 is a flowchart illustrating an example method of determining a mix-in point for a media content item.
Figure 7:
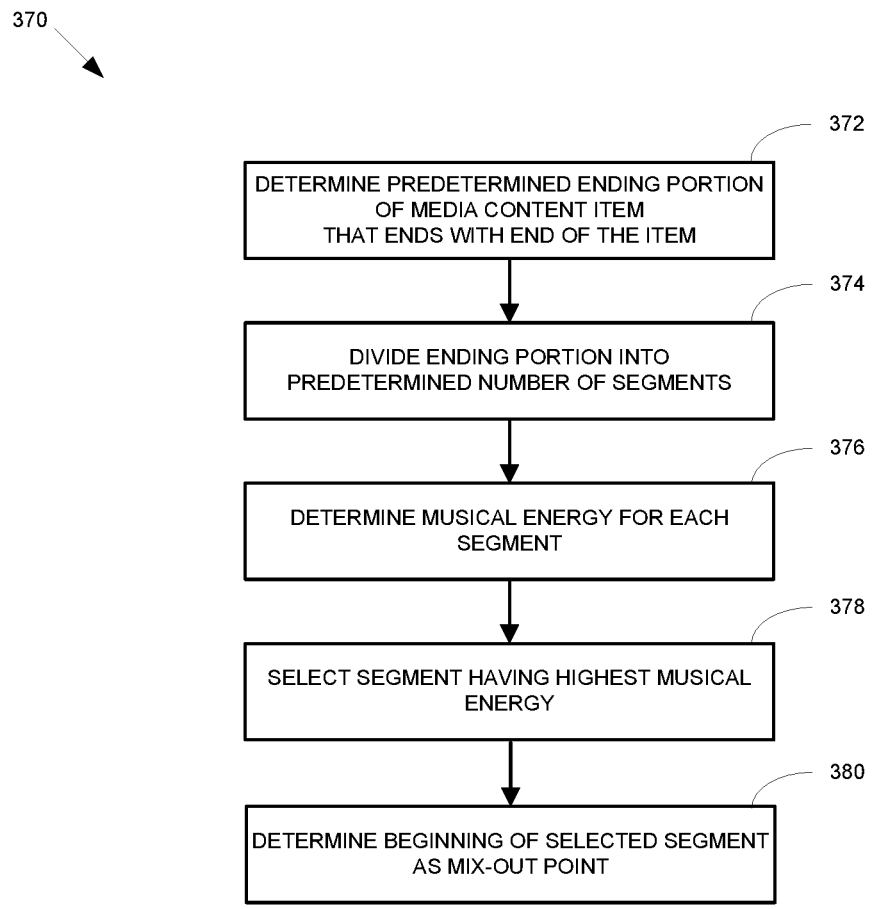
FIG. 7 is a flowchart illustrating an example method of determining a mix-out point for the media content item.
Figure 8:
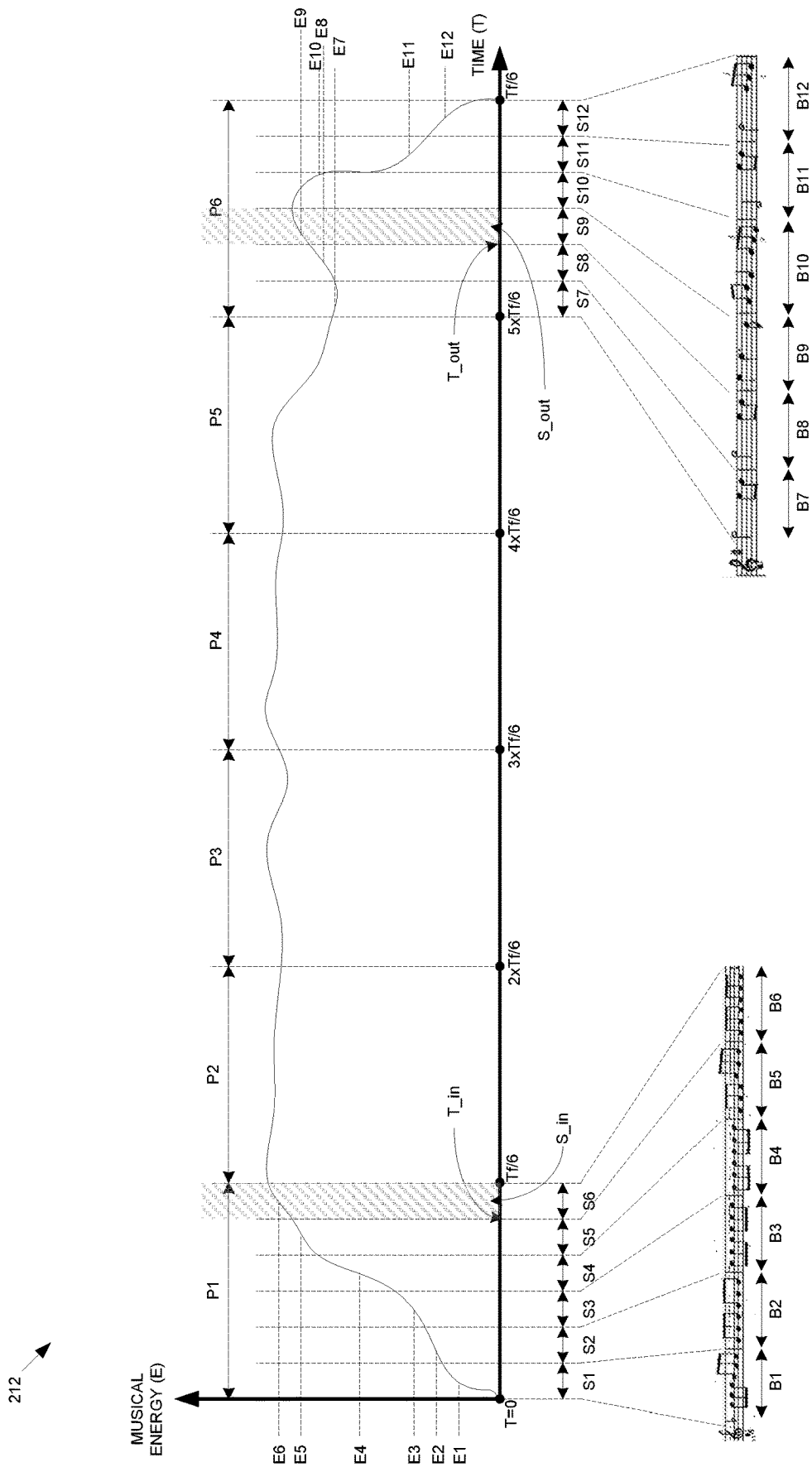
FIG. 8 schematically illustrates variations in musical energy over an entire time of the media content item.

Referring to FIGS. 6-8, a method of determining mix-in and mix-out points of a media content item 212 is described. In particular, FIG. 6 is a flowchart illustrating an example method 350 of determining a mix-in point ($T_{IN}$) for a media content item 212, and FIG. 7 is a flowchart illustrating an example method of determining a mix-out point ($T_{OUT}$) for the media content item 212. FIG. 8 schematically illustrates variations in musical energy (E) over the entire time (T) of the media content item 212.

The methods 350 and 370 can be executed by the media mix data generation engine 240. Although it is described that the media mix data generation engine 240 is used to perform the method 350 herein, it is apparent that the method 350 can be performed by other computing devices in other embodiments.

Referring to FIG. 6, some embodiments of the method 350 include operations 352, 354, 356, 358, and 360.

At the operation 352, the media mix data generation engine 240 operates to determine a predetermined beginning portion of a media content item 212 from the beginning (T=0) of the media content item 212. In some embodiments, the predetermined beginning portion is a first portion of a plurality of identically-divided portions of the media content item 212. For example, as illustrated in FIG. 8, where the media content item 212 is divided by six portions having the same length, the predetermined beginning portion of the media content item 212 is the first portion (P1) of the media content item 212, which is a portion of the media content item 212 in a time range of zero to a sixth ($T_f/6$) of the entire time length ($T_f$). In other embodiments, the predetermined beginning portion can be defined in different manners.

At the operation 354, the media mix data generation engine 242 operates to divide the beginning portion (P1) into a predetermined number of segments, such as S1-S6 (FIG. 8). In some embodiments, the segments are divided in the same time length. In other embodiments, at least one of the segments has different time lengths. In the illustrated example of FIG. 8, the beginning portion (P1) is divided into six segments S1-S6. However, the number of segments is not limited to six and can be any number.

In some embodiments, the segments (e.g., S1-S6) are defined by bars (e.g., B1-B6) within the beginning portion (P1) of the media content item 212. A bar is a segment of time corresponding to a specific number of beats in which each beat is represented by a particular note value, and the boundaries of the bar are indicated by vertical bar lines. In other embodiments, each segment (e.g., S1-S6) is defined by one bar (e.g., B1-B6) as illustrated in FIG. 8. In other embodiments, each segment (e.g., S1-S6) is defined by two or more bars (e.g., B1-B6).

At the operation 356, the media mix data generation engine 242 operates to determine a musical energy (E) for each segment (S1-S6). In some embodiments, a musical energy (E) for each segment (S1-S6) is determined as the average of variations in the musical energy over that segment. Other methods for calculating the musical energy (E) for each segment are also possible.

At the operation 358, the media mix data generation engine 242 operates to select a segment having the highest musical energy. In the illustrated example of FIG. 8, the segment (S6) has the highest musical energy (E6), and therefore is selected as a mix-in segment ($S_{IN}$) by the media mix data generation engine 242.

At the operation 360, the media mix data generation engine 242 operates to define the beginning of the selected segment as a mix-in point ($T_{IN}$). In the illustrated example of FIG. 8, the beginning of the segment (S6) is determined to be the mix-in point ($T_{IN}$) of the media content item 212.

Referring to FIG. 7, some embodiments of the method 370 includes operations 372, 374, 376, 378, and 380. The method 370 can be performed similarly to the method 350.

At the operation 372, the media mix data generation engine 240 operates to determine a predetermined ending portion of the media content item 212 that ends with the end ($T=T_f$) of the media content item 212. In some embodiments, the predetermined ending portion is a last portion of a plurality of identically-divided portions of the media content item 212. For example, as illustrated in FIG. 8, where the media content item 212 is divided by six portions having the same length, the predetermined ending portion of the media content item 212 is the last portion (P6) of the media content item 212, which is a portion of the media content item 212 in a time range of five sixth ($5 \times T_f/6$) to the end ($T_f$) of the entire time length. In other embodiments, the predetermined beginning portion can be defined in different manners.

At the operation 374, the media mix data generation engine 242 operates to divide the ending portion (P6) into a predetermined number of segments, such as S7-S12 (FIG. 8). In some embodiments, the segments are divided in the same time length. In other embodiments, at least one of the segments has different time lengths. In the illustrated example of FIG. 8, the ending portion (P6) is divided into six segments S7-S12. However, the number of segments is not limited to six and can be any number.

In some embodiments, the segments (e.g., S7-S12) are defined by bars (e.g., B7-B12) within the ending portion (P6) of the media content item 212. In other embodiments, each segment (e.g., S7-S12) is defined by one bar (e.g., B7-B12) as illustrated in FIG. 8. In other embodiments, each segment (e.g., S7-S12) is defined by two or more bars (e.g., B7-B12).

In some embodiments, the segments (e.g., S7-S12) in the ending portion (e.g., P6) are defined to not only have the same time lengths therebetween, but have the same time lengths of the segments (e.g., S1-S6) of the beginning portion (e.g., P1) of the media content item 212. As a plurality of media content items 212 are analyzed in the same manner as described in FIGS. 6 and 7, a segment including a mix-out point in an ending portion of a content media item can completely overlap a segment including a mix-in point in a beginning portion of a subsequent content media item, when the two content media items are crossfaded for smooth transition. This ensures a smooth overlap between the content media items.

In other embodiments, the time length of segments in ending portions of media content items can be different from the time length of segment in beginning portion of the media content items.

At the operation 376, the media mix data generation engine 242 operates to determine a musical energy (E) for each segment (S7-S12). In some embodiments, a musical energy (E) for each segment (S7-S12) is determined as the average of variations in the musical energy over that segment. Other methods for calculating the musical energy (E) for each segment are also possible.

At the operation 378, the media mix data generation engine 242 operates to select a segment having the highest musical energy. In the illustrated example of FIG. 8, the segment (S9) has the highest musical energy (E9), and therefore is selected as a mix-out segment ($S_{OUT}$) by the media mix data generation engine 242.

At the operation 380, the media mix data generation engine 242 operates to define the beginning of the selected segment as a mix-out point ($T_{OUT}$). In the illustrated example of FIG. 8, the beginning of the segment (S9) is determined to be the mix-out point ($T_{OUT}$) of the media content item 212.

FIG. 9 illustrates an example crossfade data 400 including information about the mix-in points ($T_{IN}$) and mix-out points ($T_{OUT}$) of the media content items 212. In some embodiments, the data 400 includes a media content item ID column 402, a mix-in point column 404, and a mix-out point column 406.

The media content item ID column 402 contains attributes that are used to identify each media content item 212.

The mix-in point column 404 contains information about mix-in points ($T_{IN}$) of media content items 212.

The mix-out point column 406 contains information about mix-out points ($T_{OUT}$) of the media content items 212.

In some embodiments, the crossfade data 400 is incorporated in the repetitive-motion activity media metadata 232. In other embodiments, the crossfade data 400 is maintained separately from the repetitive-motion activity media metadata 232.

Figure 10:
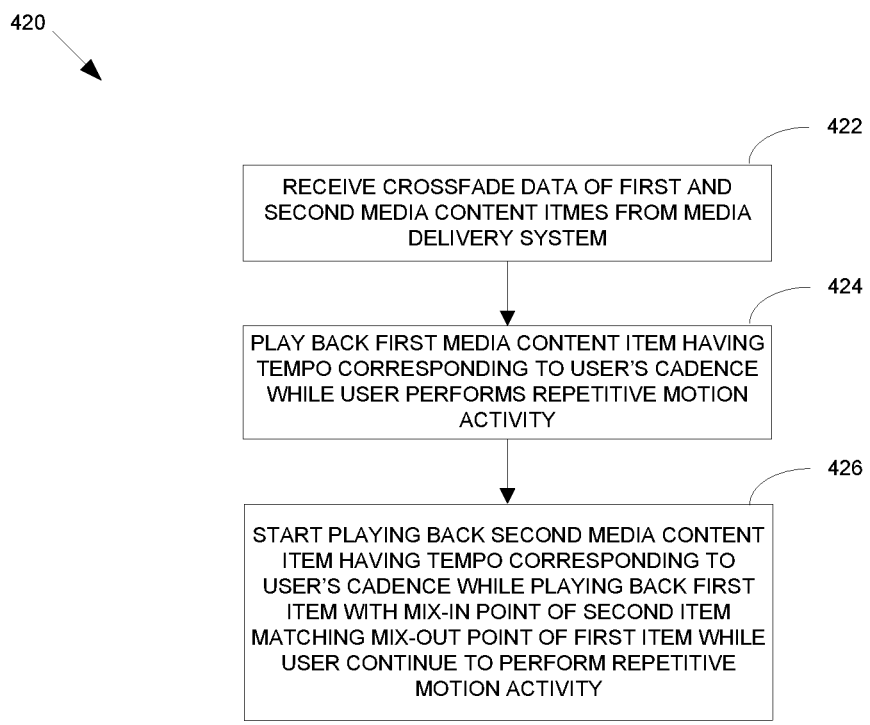
FIG. 10 is a flowchart illustrating an example method of performing an operation of FIG. 3.
Figure 11:
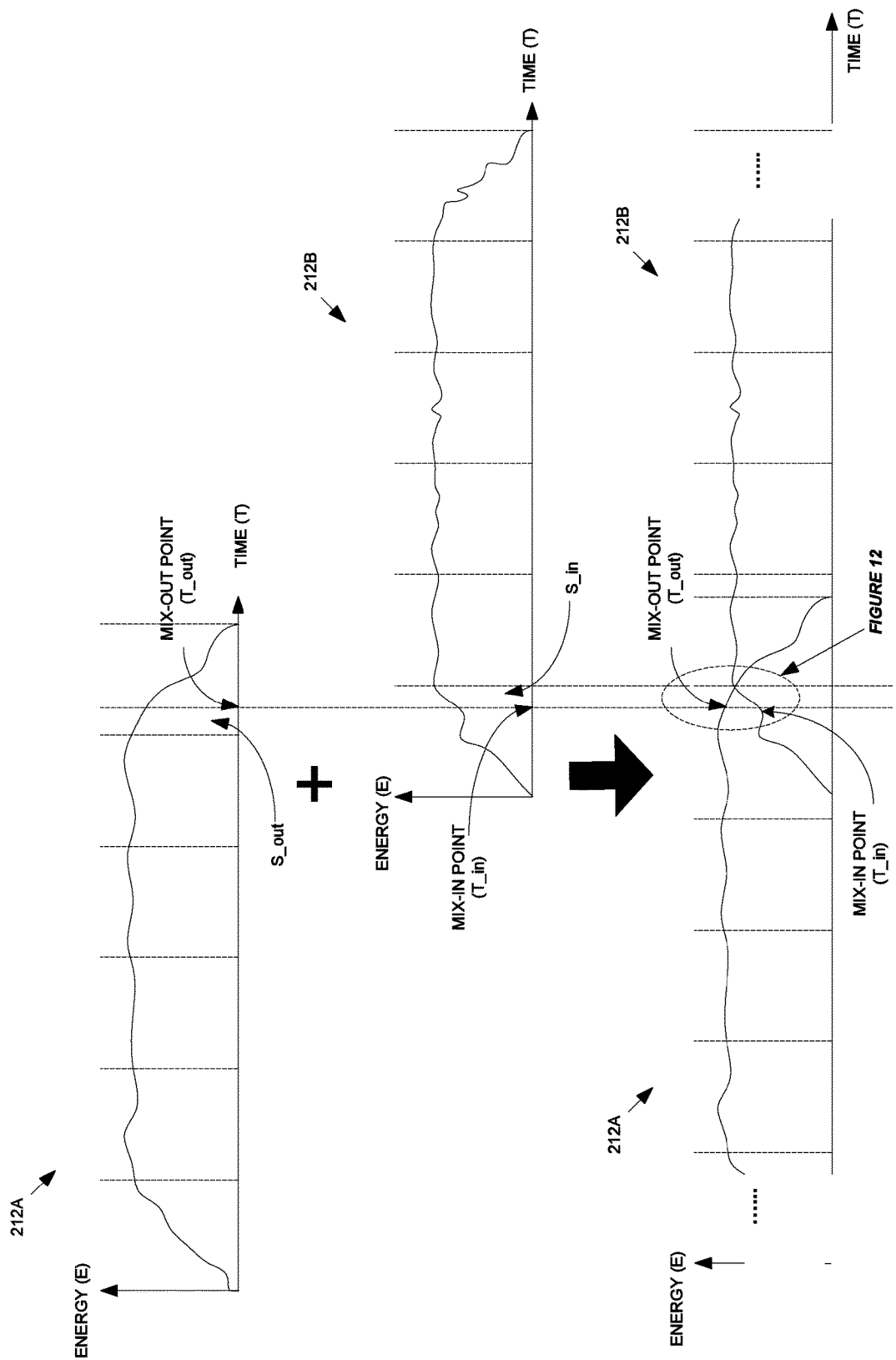
FIG. 11 illustrates the method of FIG. 10 with two media content items.

Referring to FIGS. 10 and 11, an example method of playing back media content items with smooth transitions therebetween to continuously support a user's repetitive motion activity. In particular, FIG. 10 is a flowchart illustrating an example method 420 of performing the operation 304 of FIG. 3, and FIG. 11 illustrates the method 420 with two media content items 212A and 212B.

Referring now to FIG. 10, some embodiments of the method 420 include operations 422, 424, and 426.

In some embodiments, the media-playback device 102 including the cadence-based media content crossfade engine 112 is configured to execute the method 420. Although it is described in this document that the media-playback device 102 (including the cadence-based media content crossfade engine 112) is used to perform the method 420, it is apparent that the method 420 can be performed by other computing devices in other embodiments.

At the operation 422, the media-playback device 102 (e.g., the cadence-based media content crossfade engine 112) operates to receive the crossfade data 400 from the media-delivery system 104. The crossfade data 400 contain information about mix-in and mix-out points for media content items 212 (including a first media content item 212A and a second media content item 212B) that are to be played back on the media-playback device 102.

At the operation 424, the media-playback device 102 operates to play back the first media content item 212A having a tempo corresponding to a user's cadence acquired by the media-playback device 102 while the user performs a repetitive motion activity (e.g. running) as described above.

At the operation 426, the media-playback device 102 starts playing back the second media content item 212B as the first media content item 212A approaches to its end. Similarly to the first media content item 212A, the second media content item 212B has a tempo corresponding to the user's cadence. In some embodiments, the media-playback device 102 plays the second media content item 212B while playing back the first content media item 212A during the user's repetitive motion activity such that the mix-in point ($T_{IN}$) of the second media content item 212B matches the mix-out point ($T_{OUT}$) of the first media content item 212A.

As illustrated in FIG. 11, the mix-out point ($T_{OUT}$) of the first content media item 212A is aligned with the mix-in point ($T_{IN}$) of the second content media item 212B, and the first and second media content items 212A and 212B are crossfaded around the mix-in and mix-out points ($T_{IN}$ and $T_{OUT}$). As described above, the first and second media content items 212A and 212B are selected by the media-playback device 102 to have a tempo corresponding to the user's cadence. Therefore, the media-playback device 102 can play back the first and second media content items 212A and 212B with smooth transition therebetween, which maintaining substantially consistent musical energy throughout the two media content items 212A and 212B (e.g., maintaining substantially equal power before, during, and after transitions). In some embodiments, a limiter is provided to manage the musical energy of media content items to substantially an equal level over transitions between the media content items. A limiter is a circuit that allows signals below a specified input power to pass unaffected while attenuating the peaks of stronger signals that exceed that input power. In some embodiments, the limiter can perform a dynamic range compression (DRC).

As the media-playback device 102 operates to play back a plurality of media content items 212 in this manner, a consistent musical energy suitable for a user's repetitive motion activity can continue over transitions between different media content items 212. Further, as a plurality of media content items 212 are selected to have a tempo corresponding to a user's cadence, the media content items 212 need not be processed to match the tempo therebetween.

Figure 12:
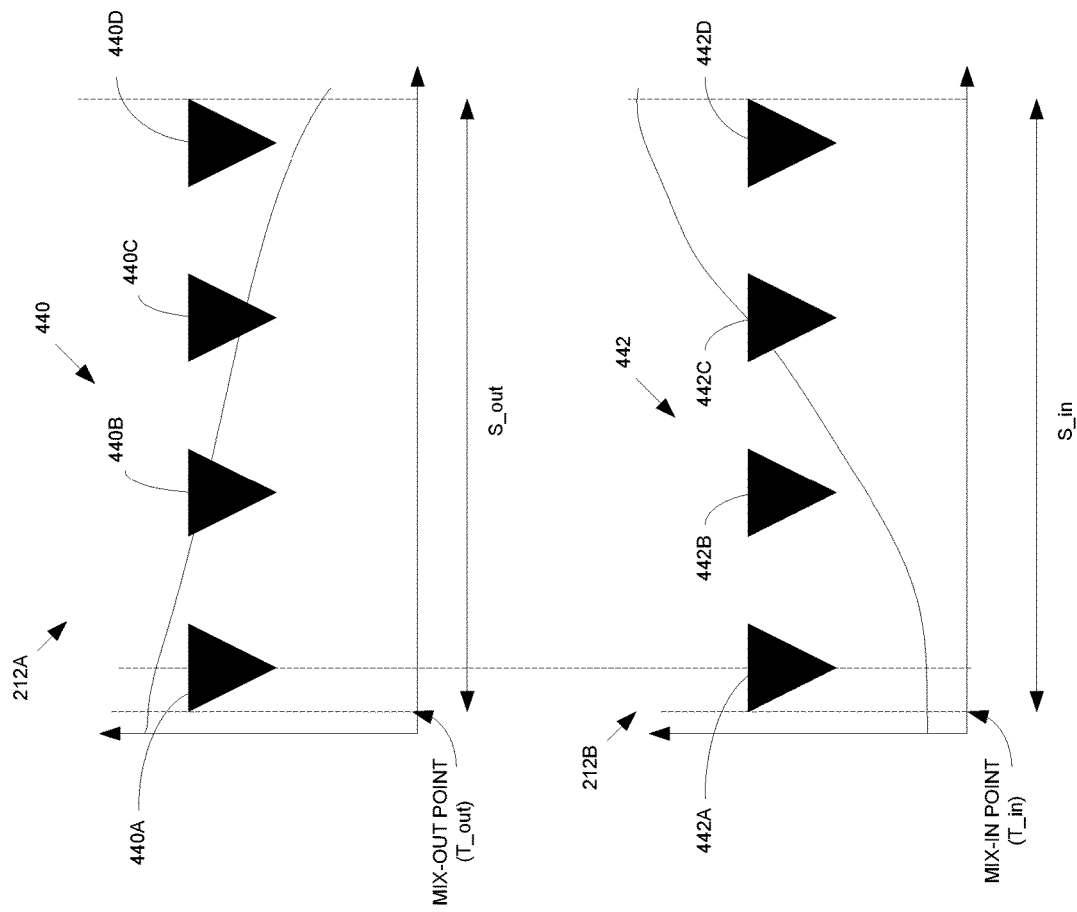
FIG. 12 illustrates an example method of aligning the mix-out point of a first media content item and the mix-in point of a second media content item.

FIG. 12 illustrates an example method of aligning the mix-out point ($T_{OUT}$) of the first media content item 212A and the mix-in point ($T_{IN}$) of the second media content item 212B. In some embodiments, as the mix-in point ($T_{IN}$) and the mix-out point ($T_{OUT}$) are matched, the media-playback device 102 can operate to match at least one beat 440 (including 440A-440D) in the mix-out segment ($S_{OUT}$) of the first media content item 212A with at least one beat 442 (including 442A-442D) in the mix-in segment ($S_{IN}$) of the second media content item 212B.

In some embodiments, when the mix-out point ($T_{OUT}$) of the first media content item 212A is aligned with the mix-in point ($T_{IN}$) of the second media content item 212B, a downbeat 440A in the mix-out segment (e.g., bar) ($S_{OUT}$) of an ending portion of the first media content item 212A matches a downbeat 442A in the mix-in segment (e.g., bar) ($S_{IN}$) of a beginning portion of the second media content item 212B. Since the consecutive media content items 212 (e.g., a first media content item 212A and a second media content item 212B) are selected to have the same tempo or similar tempi, which correspond to a user's cadence, segments in an ending portion of the first media content item 212A have the same beats as in segments in a beginning portion of the second media content item 212B. Therefore, when the downbeats 440A and 440B are matched with the first and second media content items 212A and 212B overlapping, all of the beats 440 and 442 in the overlapped segments (i.e., the segment in the ending portion of the first media content item and the segment in the beginning portion of the second media content item) can be aligned.

In other embodiments, other beats in the mix-out segment ($S_{OUT}$) and mix-in segment ($S_{IN}$) can be used for the beat matching as described above. In yet other embodiments, multiple beats from the mix-out segment ($S_{OUT}$) and mix-in segment ($S_{IN}$) can be used to be matched in similar manners. In yet other embodiments, one or more beats around the mix-out segment ($S_{OUT}$) and mix-in segment ($S_{IN}$) (but not necessarily within the mix-out segment ($S_{OUT}$) and mix-in segment ($S_{IN}$)) can be used for the beat matching.

In some cases, at least one of the beats 440 of the first media content item 212A are not completely aligned with at least one of the beats 442 of the second media content item 212B when the first and second content items are crossfaded. Although the beats of the first media content item can be off-phased with the beats of the second media content item, the user will not be distracted very much because the same tempo continues once the overlapped portion ends and the second media content item is only played back.

Figure 13:
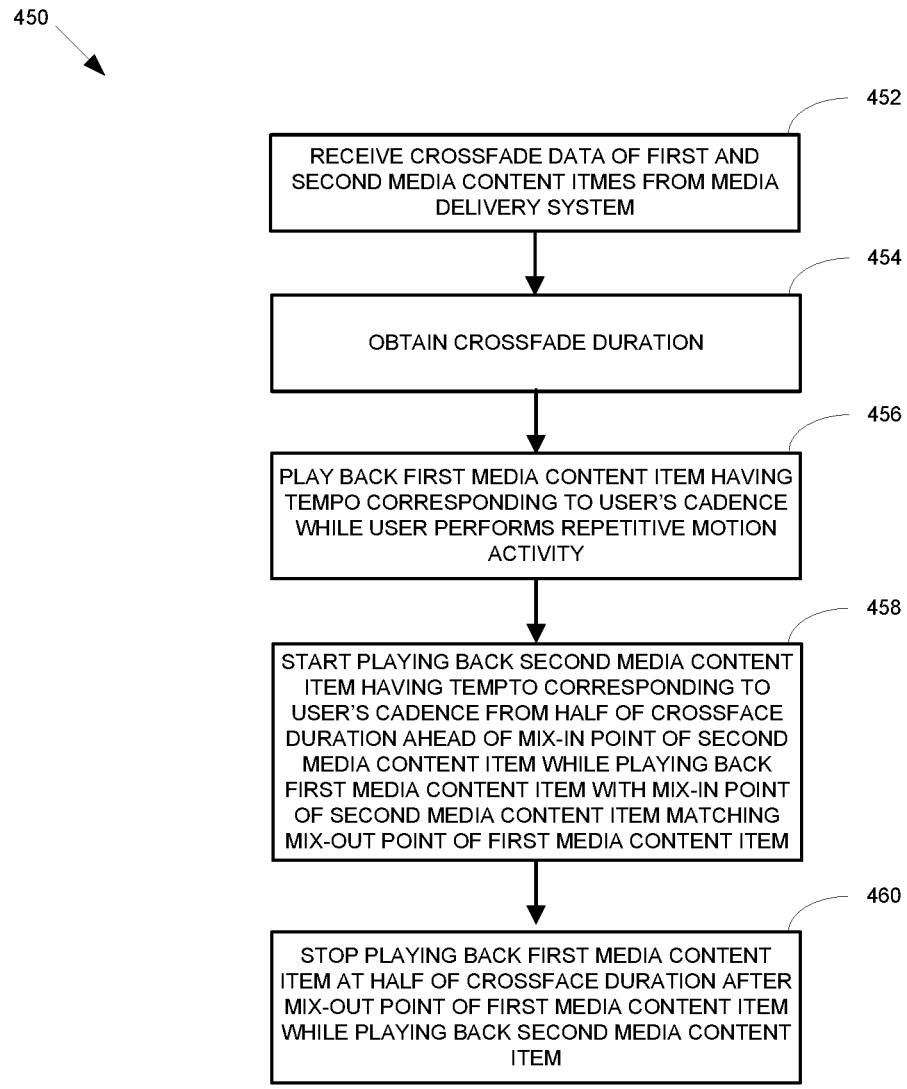
FIG. 13 is a flowchart illustrating an example method of performing an operation of FIG. 3.
Figure 14:
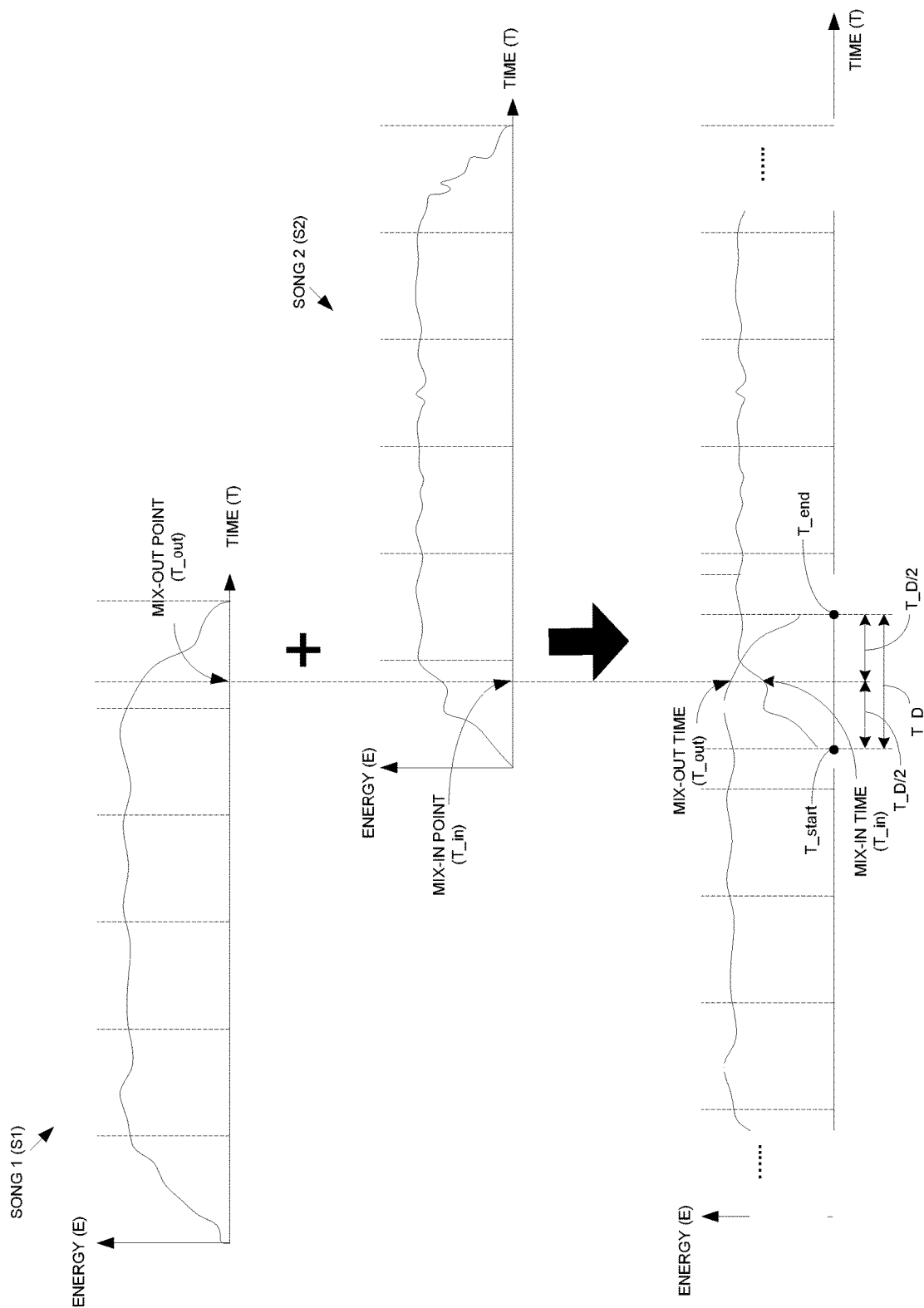
FIG. 14 illustrates the method of FIG. 13 with two media content items.

Referring to FIGS. 13 and 14, another example method of playing back media content items with smooth transitions therebetween to continuously support a user's repetitive motion activity. In particular, FIG. 13 is a flowchart illustrating an example method 450 of performing the operation 304 of FIG. 3, and FIG. 14 illustrates the method 450 with two media content items 212A and 212B. The method 450 is similar to the method 420 except that media content items 212 are overlapped during predetermined duration. Thus, the description for the method 420 with reference to FIGS. 10-12 is incorporated by reference for the method 450.

Referring to FIG. 13, some embodiments of the method 450 include operations 452, 454, 456, 458, and 460.

In some embodiments, the media-playback device 102 including the cadence-based media content crossfade engine 112 is configured to execute the method 450. Although it is described in this document that the media-playback device 102 (including the cadence-based media content crossfade engine 112) is used to perform the method 450, it is apparent that the method 450 can be performed by other computing devices in other embodiments.

At the operation 452, the media-playback device 102 (e.g., the cadence-based media content crossfade engine 112) operates to receive the crossfade data 400 from the media-delivery system 104. The crossfade data 400 contain information about mix-in and mix-out points for media content items 212 (including a first media content item 212A and a second media content item 212B) that are to be played back on the media-playback device 102.

At the operation 454, the media-playback device 102 operates to obtain crossfade duration ($T_D$) (FIG. 14). In some embodiments, the crossfade duration can be selected by a user. For example, the media-playback device 102 provides a user interface 470 (FIG. 15) to prompt a user to select the crossfade duration. An example user interface 470 is described and illustrated in more detail with reference to FIG. 15. In other embodiments, the crossfade duration can be automatically adjusted by the media-playback device 102 based on various factors, such as a level of musical energy as defined herein.

At the operation 456, the media-playback device 102 operates to play back the first media content item 212A having a tempo corresponding to a user's cadence acquired by the media-playback device 102 while the user performs a repetitive motion activity (e.g. running) as described above.

At the operation 458, the media-playback device 102 starts playing back the second media content item 212B as the first media content item 212A approaches to its end. Similarly to the first media content item 212A, the second media content item 212B has a tempo corresponding to the user's cadence. In some embodiments, the media-playback device 102 plays the second media content item 212B while playing back the first content media item 212A during the user's repetitive motion activity such that the mix-in point ($T_{IN}$) of the second media content item 212B matches the mix-out point ($T_{OUT}$) of the first media content item 212A.

In this example, the media-playback device 102 starts playing back the second media content item 212B at a time ($T_{START}$) ahead of the mix-in point ($T_{IN}$) of the second media content item 212B. In some embodiments, the time ($T_{START}$) is defined as a time a half ($T_D/2$) of the crossfade duration ($T_D$) ahead of the mix-in point ($T_{IN}$) of the second media content item 212B. In other embodiments, the time ($T_{START}$) can be defined differently, such as a time a quarter ($T_D/4$) of the crossfade duration ($T_D$) ahead of the mix-in point ($T_{IN}$) of the second media content item 212B.

At the operation 460, the media-playback device 102 operates to stop playing back the first media content item 212A while playing back the second media content item 212B. In some embodiments, the media-playback device 102 ceases to play back the first media content item 212A at a time ($T_{END}$) after the mix-out point ($T_{OUT}$) of the first media content item 212A. In some embodiments, the time ($T_{END}$) is defined as a time a half ($T_D/2$) of the crossfade duration ($T_D$) after the mix-out point ($T_{OUT}$) of the first media content item 212A. In other embodiments, the time ($T_{END}$) can be defined differently, such as a time a quarter ($T_D/4$) of the crossfade duration ($T_D$) after the mix-out point ($T_{OUT}$) of the first media content item 212A.

As the method 450 is performed similarly to the method 420, all of the features and advantages of the method 420 are also achieved in the method 450. In addition, the crossfade duration employed in the method 450 can selectively reduce an overlap time between media content items and therefore allow much smooth transitions between media content items.

In some embodiments, the crossfade duration ($T_D$) is determined by a number of beats around the mix-in and mix-out points that are aligned. By way of example, the crossfade duration ($T_D$) is set to include two beats prior to the aligned mix-in and mix-out points and two beats after the aligned mix-in and mix-out points. In other examples, the crossfade duration ($T_D$) can be determined to include a different number (i.e., other than two) of beats before and after mix-in and mix-out points. In some embodiments, the number of beats before the aligned mix-in and mix-out points can be the same as the number of beats after the aligned mix-in and mix-out points. In other embodiments, the number of beats before the aligned mix-in and mix-out points can be different from the number of beats after the aligned mix-in and mix-out points.

Figure 15:
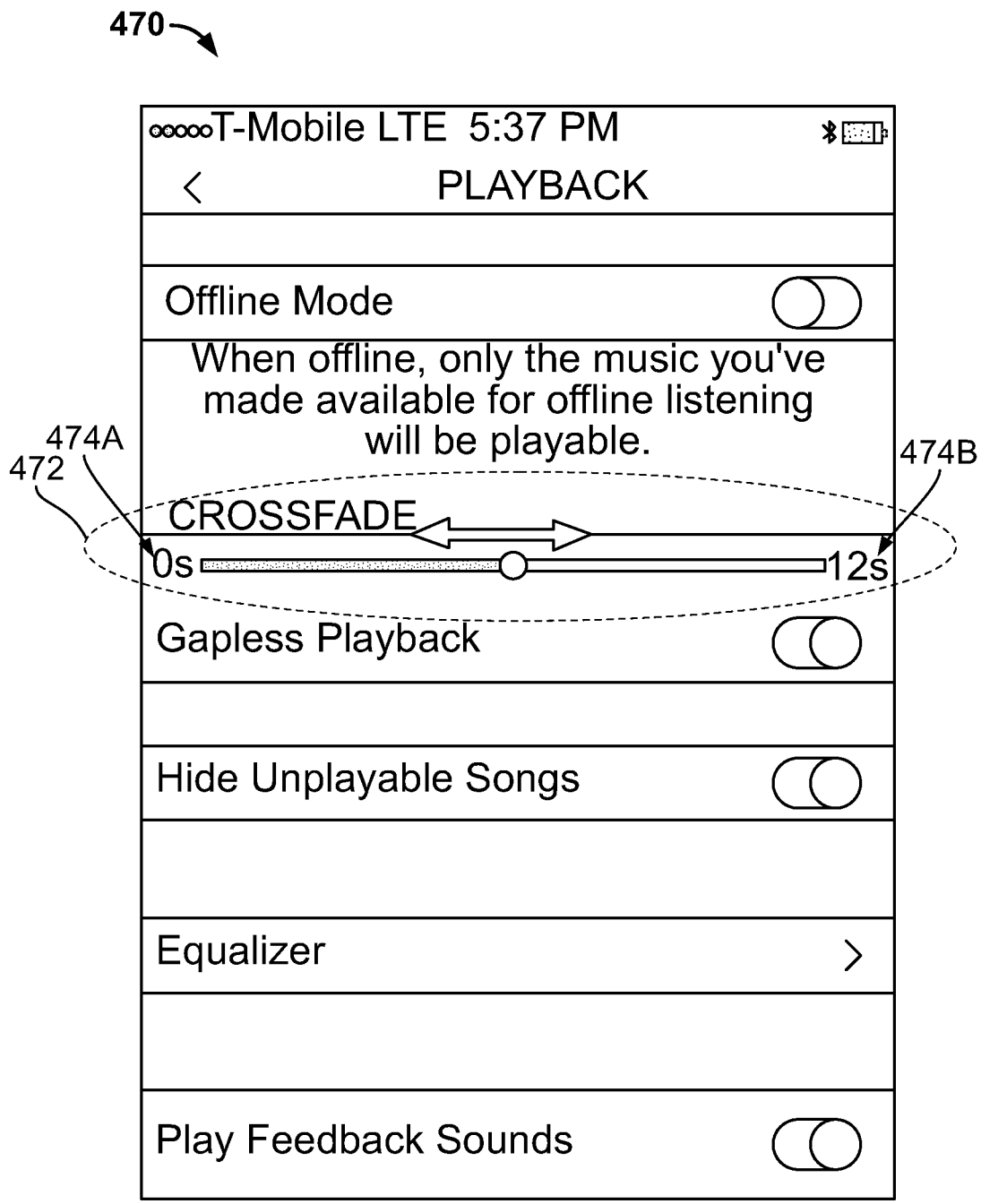
FIG. 15 is an example user interface for selecting crossfade duration.

FIG. 15 is an example user interface 470 for selecting the crossfade duration ($T_D$). In some embodiments, the user interface 470 is provided on the media-playback device 102. The user interface 470 includes a crossfade selection control 472 configured to select a length of the crossfade duration ($T_D$). In some embodiments, the crossfade selection control 472 provides preset upper and lower limits 474A and 474B so that a user adjusts the crossfade duration ($T_D$) therebetween. In the illustrated example, the crossfade selection control 472 is described as a horizontal adjust bar. In other embodiments, the crossfade selection control 472 can be of various other types.

As noted previously, although many of the examples provided above are described with respect to running, other embodiments relate to other repetitive motion activities as well such as cycling, swimming, and rowing.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. It is to be understood that a numerical range is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A method of continuously playing back a plurality of media content items, the method comprising:
   determining, using at least one computing device, a mix-out point of a first media content item, comprising:
      dividing the first media content item into a plurality of sections;
      determining an ending section of the plurality of sections;
      dividing the ending section into a plurality of segments;
      determining a value of a musical attribute for each of the plurality of segments of the ending section;
      identifying, from the plurality of segments of the ending section, a segment of the ending section having the musical attribute with a highest value; and
      defining a beginning of the identified segment of the ending section as the mix-out point of the first media content item;
   playing back the first media content item on a media playback device;
   determining an alignment of the mix-out point of the first media content item with a mix-in point of a second media content item; and
   playing back the second media content item on the media playback device based on the determined alignment.

2. The method of claim 1, wherein the at least one computing device includes the media playback device.

3. The method of claim 1, further comprising:
   determining, using the at least one computing device, the mix-in point of the second media content item, comprising:
      dividing the second media content item into a plurality of sections;
      determining a beginning section of the plurality of sections;
      dividing the beginning section into a plurality of segments;
      determining a value of a musical attribute for each of the plurality of segments of the beginning section;
      identifying, from the plurality of segments of the beginning section, a segment of the beginning section having the musical attribute with a highest value; and
      defining a beginning of the identified segment of the beginning section as the mix-in point of the second media content item.

4. The method of claim 3, wherein the value of the musical attribute determined for each of the plurality of segments of the ending section of the first media content item and each of the plurality of segments of the beginning section of the second media content item is calculated based on variations in the musical attribute over the respective segment of the ending section and the beginning section, respectively.

5. The method of claim 4, wherein the musical attribute includes tempo.

6. The method of claim 4, wherein the musical attribute includes sound power.

7. The method of claim 4, wherein the musical attribute is selected from a group consisting of pitch, dynamics, rhythm, articulation, timbre, and order.

8. The method of claim 3, further comprising:
   determining an adjustment of the alignment of the mix-out point of the first media content item with the mix-in point of the second media content item to match at least one beat within the identified segment of the ending section of the first media content item with at least one beat within the identified segment of the beginning section of the second media content item.

9. The method of claim 8, further comprising:
   adjusting at least one of a value of the musical attribute of the identified segment of the ending section of the first media content item and a value of the musical attribute of the identified segment of the beginning section of the second media content item to equalize the values when transitioning between the first media content item and the second media content item.

10. The method of claim 1, wherein the first media content item and the second media content item are played back to match a downbeat around the mix-out point of the first media content item with a downbeat around the mix-in point of the second media content item.

11. A method of continuously playing back a plurality of media content items, the method comprising:
   playing back a first media content item on a media playback device;
   determining, using at least one computing device, a mix-in point of a second media content item, comprising:
      dividing the second media content item into a plurality of sections;
      determining a beginning section of the plurality of sections;
      dividing the beginning section into a plurality of segments;

determining a value of a musical attribute for each of the plurality of segments of the beginning section;

identifying, from the plurality of segments of the beginning section, a segment of the beginning section having the musical attribute with a highest value; and defining a beginning of the identified segment of the beginning section as the mix-in point of the second media content item;

determining an alignment of a mix-out point of the first media content item with the mix-in point of the second media content item; and playing back the second media content item on the media playback device based on the determined alignment.

12. The method of claim 11, wherein the at least one computing device includes the media playback device.

13. The method of claim 11, wherein the value of the musical attribute for each of the plurality of segments of the beginning section is calculated based on variations in the musical attribute over the respective segment of the beginning section.

14. The method of claim 13, wherein the musical attribute includes tempo.

15. The method of claim 13, wherein the musical attribute includes sound power.

16. The method of claim 11, further comprising:

determining an adjustment of the alignment of the mix-out point of the first media content item with the mix-in point of the second media content item to match at least one beat within a segment of an ending section of the first media content item identified as having a musical attribute with a highest value with at least one beat within the identified segment of the beginning section of the second media content item.

17. The method of claim 16, further comprising:

adjusting at least one of a value of the musical attribute of the identified segment of the ending section of the first media content item and a value of the musical attribute of the identified segment of the beginning section of the second media content item to equalize the values when transitioning between the first media content item and the second media content item.

18. A method of providing a continuous transition during playback of a plurality of media content items, the method comprising:

determining, using at least one computing device, a mix-out point of a first media content item, comprising:

dividing the first media content item into a plurality of sections;

determining an ending section of the plurality of sections;

dividing the ending section into a plurality of segments;

determining a value of a musical attribute for each of the plurality of segments of the ending section of the first media content item;

identifying, from the plurality of segments of the ending section, a segment of the ending section having the musical attribute with a highest value; and defining a beginning of the identified segment of the ending section as the mix-out point of the first media content item;

determining, using the at least one computing device, a mix-in point of a second media content item, comprising:

dividing the second media content item into a plurality of sections;

determining a beginning section of the plurality of sections;

dividing the beginning section into a plurality of segments;

determining a value of a musical attribute for each of the plurality of segments of the beginning section of the second media content item;

identifying, from the plurality of segments of the beginning section, a segment of the beginning section having the musical attribute with a highest value; and defining a beginning of the identified segment of the beginning section as the mix-in point of the second media content item;

storing the mix-out point of the first media content item as mix-out point data for the first media content item;

storing the mix-in point of the second media content item as mix-in point data for the second media content item; and transmitting the mix-out point data and the mix-in point data to a media playback device for playback of the first media content item and the second media content item on the media playback device with the mix-out point of the first media content item aligned with the mix-in point of the second media content item.

19. The method of claim 18, wherein the value of the musical attribute determined for each of the plurality of segments of the ending section of the first media content item and each of the plurality of segments of the beginning section of the second media content item is calculated based on variations in the musical attribute over the respective segment of the ending section and the beginning section, respectively.

20. The method of claim 19, wherein the musical attribute includes one or more of tempo and sound power.

* * * * *